United States Patent [19]

Case et al.

[11] Patent Number: 5,278,236
[45] Date of Patent: Jan. 11, 1994

[54] POLYMERIC PLASTICIZERS FOR POLYVINYL CHLORIDE

[75] Inventors: Ronald B. Case, Newark, Del.; Robert J. Statz, Kennett Square, Pa.

[73] Assignee: E. I. Du Pont de Nemours and Company, Wilmington, Del.

[21] Appl. No.: 694,104

[22] Filed: Apr. 23, 1991

Related U.S. Application Data

[63] Continuation-in-part of Ser. No. 347,053, May 4, 1989, abandoned.

[51] Int. Cl.$^5$ .................. C08L 27/06; C08L 81/00
[52] U.S. Cl. ...................................... 525/189; 525/190
[58] Field of Search ................ 525/185, 189, 188, 190

[56] References Cited

U.S. PATENT DOCUMENTS

| | | | |
|---|---|---|---|
| 3,780,140 | 12/1973 | Hammer et al. | 525/185 |
| 4,391,922 | 7/1983 | Harrell | 521/88 |
| 4,489,193 | 12/1984 | Goswami | 525/190 |
| 4,613,533 | 9/1986 | Loomes et al. | 428/36 |
| 4,699,857 | 10/1987 | Giovannoni et al. | 429/204 |

OTHER PUBLICATIONS

"Webster's Third New International Dictionary" G&C Merriam Company Mass., U.S.A. 1963, p. 316, col. 2, defining $^2$calenered.

Primary Examiner—James J. Seidleck
Attorney, Agent, or Firm—Paul R. Steyermark

[57] ABSTRACT

Blends of polyvinyl chloride with E/X/Y terpolymers, in which X is a $C_1$–$C_{10}$ n-alkyl acrylate and Y is CO or $SO_2$, the terpolymers having a swelling ratio of no more than 2.14, can be calendered into smooth sheets, which are suitable for use in such applications as instrument panel skins, pond liners, roofing membranes, etc.

13 Claims, No Drawings

POLYMERIC PLASTICIZERS FOR POLYVINYL CHLORIDE

CROSS-REFERENCE TO RELATED APPLICATION

This is a continuation in part of my copending application Ser. No.07/347,053 filed May 4, 1989 now abandoned.

BACKGROUND OF THE INVENTION

This invention relates to certain polyvinyl chloride compositions having improved properties and processability consisting essentially of blends of polyvinyl chloride with plasticizers which are members of a class of defined terpolymers.

It is known in the art to add plasticizers to polyvinyl chloride (PVC) to improve its flexibility. Although various plasticizers have been used in such applications, certain ethylene terpolymers of the general formula E/X/CO, where E is ethylene, and X is a "softening" monomer such as, for example, vinyl acetate or an acrylic ester, have been found to be particularly suitable for this purpose. Such terpolymers and their use as plasticizers for PVC e described in U.S. Pat. No. 3,780,140 to Hammer. Because of their polymeric nature, these materials do not have the tendency, exhibited by conventional aromatic ester type plasticizers, of exuding or evaporating with time from PVC, which would make PVC brittle and unsuitable for many applications. These polymeric plasticizers have the additional advantage that they are completely compatible with PVC within rather broad composition ranges. Terpolymers having the same general structure, but with the $SO_2$ group replacing the CO group, have been disclosed in U.S. Pat. No. 3,684,778 to Hammer and are suitable for the same purpose.

When the softening monomer in the terpolymer is vinyl acetate, calendered sheets of PVC blends with such a terpolymer are generally satisfactory. However, such terpolymers are less thermally stable than when the softening monomer in the terpolymer is an acrylic acid ester, so that PVC blends with a terpolymer containing an acrylic acid ester comonomer would be more desirable. Nevertheless, calendered sheets made of PVC plasticized with acrylic acid ester-containing terpolymers described in the above two patents generally are rough, rather than smooth. This means that those blends have "high nerve".

It would be desirable, therefore, to be able to plasticize PVC in a manner which would permit the plasticized polymer to be calendered into smooth sheets.

SUMMARY OF THE INVENTION

According to this invention, it has now been unexpectedly discovered that there is a correlation between roughness of calendered sheets of a blend of PVC with an E/X/Y terpolymer, where Y is CO or $SO_2$, and the terpolymer's swelling ratio, which is defined as the ratio of the maximum diameter of terpolymer extruded from a standard melt indexer to that of the indexer's orifice under standardized conditions, so that the smaller that ratio, the lower is the "nerve" of sheets calendered from such blends. In particular, there is provided a blend of PVC with a terpolymer represented by the general formula E/X/Y, wherein E is ethylene; X is a $C_1$–$C_{10}$ n-alkyl acrylate; and Y is CO or $SO_2$, the respective weight proportions of X and Y in the terpolymer being 5–60 and 3–20%, ethylene constituting the balance (100% -X% -Y%) of 20–92%, said terpolymer having a swelling ratio of at most 2.14, and the amount of the terpolymer in the blend being about 20–400 parts by weight per 100 parts by weight of PVC.

Further, there is provided a smooth sheet calendered of such a blend.

DETAILED DESCRIPTION OF THE INVENTION

The goal of the invention is to provide a blend of PVC with a defined E/X/Y terpolymer having a maximum swelling ratio of 2.14. Swelling ratio is discussed in the article entitled *A Computerized System for Measurement of Transient and Equilibrium Extrudate Swell* by M. R. Kamal et al. in Advances in Polymer Technology, vol. 8, No. 4, pp. 367-381 (1988), John Wiley and Sons, Inc. It is believed that there is a correlation between the swelling ratio of a terpolymer and terpolymer branching, although the exact nature of this correlation has not been rigorously established. It is believed that swelling ratio relates at least to some extent to molecular weight distribution (MWD) and to the level and geometry of long chain branching believed to be present in these terpolymers. Reactions which cause long chain branching affect MWD. They produce "high molecular weight tails" in the distribution. However, MWD does not provide a complete picture of the size parameters of a polymer because it does not take into account the branching geometry. Fewer branches with longer units will affect swelling differently than more branches with shorter units, but MWD cannot adequately measure these distinctions. A commonplace approach to characterizing distribution is to use molecular weight dispersity, which is the ratio of moments of the distribution $M_w/M_n$, where $M_w$ is the weight average molecular weight, and $M_n$ is the number average molecular weight. Those terms are well understood by polymer chemists but, in any event, they are described and defined in *Principles of Polymer Chemistry* by P. Flory (Cornell University Press, 1953). MWD is conveniently determined by gel permeation chromatography. Molecular weight values are not absolute but are based on a series of standard polymers, monodisperse polystyrenes. The value of $M_w/M_n$ is then calculated from MWD. While this again is not an absolute value, it can be precisely determined for a given polymer. Some $M_w/M_n$ values have been determined by this technique for certain polymers exemplified herein. Computation of the moments is begun by summation starting at a molecular weight of 1500.

Generally, one skilled in art of homopolymerization and copolymerization of ethylene will know those process conditions that must be modified to make a terpolymer with less long chain branching, which normally results in a lower $M_w/M_n$ ratio. For example, at constant conversion, a decrease of polymerization temperature (reactor temperature) will usually produce a polymer which will have less long chain branching. Alternatively, at a constant reactor temperature, a decrease of conversion also will usually produce less branching. Therefore, in order to decrease the impact of MWD, high $M_w/M_n$ values, and long chain branching, which are believed to be associated with higher polymer swelling ratios, one would preferably operate at lower reactor temperatures and conversions.

It is considered most practical to manufacture the E/X/Y terpolymers by a continuous process. The process described in U.S. Pat. No. 3,780,140 is typical. It is a free-radical initiated, high pressure process, wherein the monomers are fed to a large, continuously stirred reactor, normally in the absence of solvents, although occasionally the addition of a small amount of a suitable solvent helps avoid polymer deposits on the inner walls of the reactor. The reactor contains a mix of polymer and monomers in readily ascertainable proportions. Conversion is the percentage of polymer in the polymer/monomer mix and can be measured directly by determining the amount of polymer present in the exit stream. If a solvent is also present, the polymer content can be calculated by material balance, the monomer and solvent input being known at steady state conditions.

In a continuous process, the rate of polymer formation (or yield) is an economically important parameter. At a given conversion, yield can be increased only by increasing the throughput of monomers in and polymer out. This depends on the equipment available, but for a given plant there is not much flexibility. Yield can also be increased by increasing conversion. Conversely, yield will be decreased when conversion is decreased, for example, by operating at a lower reactor temperature or at a higher monomer feed temperature.

The heat of polymerization is applied to heating up the cool feed monomers, so that a constant temperature is maintained in the reactor. While the heat of polymerization of each monomer is different for a given composition, the maximum attainable conversion is dependent on the temperature differential, $\Delta T$, between the cold monomers and the reactor temperature. If heat were removed by external means, instead of being used merely to heat up the cold monomers, it would be possible to operate at higher conversions. There is thus a direct relationship between $\Delta T$ and conversion.

Generally, the upper reactor temperature is limited by the tendency of the E/X/Y terpolymers to degrade. For terpolymers with n-alkyl acrylates, this upper limit is about 200° C. For the purpose of the present invention, which is to reduce long chain branching and thus terpolymer swell, it is recommended to operate at a reactor temperature of about 140°-195° C., especially at 160°-170° C. In an adiabatic process, it is sometimes possible to operate at a conversion of 14-15%. In a small polymerization unit, operated with external cooling, it has been found possible to operate at a conversion as high as 18%. However, whatever the reactor, it has been found that the maximum conversion at which the terpolymer swell ratio does not exceed 2.14 is about 11.5%. It further has been found that with the reactor temperature of about 160° C. and a conversion of at most about 8%, E/X/Y terpolymers having the desired low swell ratio always can be made. In individual cases, higher conversions and/or reactor temperatures may still be possible; those can be established by carrying out a small number of simple experiments.

Conversion can be determined by any suitable technique, but the most direct way is to measure the amount of monomers fed and recovered and the amount of polymer produced per unit of time. In an industrial operation, it often is convenient to quickly calculate the conversion from the heat balance because the heats of polymerization and specific heats of all monomers are known. This method is not quite as accurate as the calculation based on the material balance, but it can be performed much faster. For the purpose of the present invention, the correlation between the values obtained by both methods is sufficiently close to permit the operator to use either technique.

While it is not certain why terpolymers produced under such restricted conditions impart improved properties to the blends, it is believed that such conditions decrease the amount of long chain branching. Since the type and amount of branching itself cannot be directly determined, a practical approach is to determine the above-defined maximum swelling ratio of E/X/Y terpolymers made under different conditions and to select those that perform satisfactorily in blends with PVC. The maximum swelling ratio value of 2.14 has thus been established empirically. The measure of molecular weight dispersity, $M_w/M_n$, determined as described above, has been found to be only a crude guide to polymer suitability. This is no doubt because of the variability and complexity of branching geometry and branching distribution througout the polymer and of the relation of these factors to $M_w/M_n$. Thus, while X/Y/Z terpolymers with a $M_w/M_n$ value below 5.25 usually are suitable for the purpose of the present invention, it has been found that occasionally a slightly higher value still is satisfactory; on the other hand, a lower value does not always guarantee success. Invariably, however, n-alkyl acrylate terpolymers with a dispersity value above 7.0 had unacceptably high swelling ratios.

It has been found that vinyl acetate terpolymers give low swelling ratios and their blends with PVC can be calendered into smooth sheets even when the polymerization reaction is carried out to a conversion of 12.5%, and the dispersity value is as high as 6.63. It is unexpected that n-alkyl acrylate terpolymers prepared at a comparable conversion and having such a dispersity value normally are unsuitable in the present invention.

Alkyl acrylates with nonlinear alkyl groups appear to be generally unsatisfactory. Such acrylates may be referred to as branched alkyl acrylates, but one needs to keep in mind the distinction between long chain branching and short chain branching. Alkyl groups exhibiting short chain branching are well known and include, among others, all isoalkyl groups and all tert-alkyl groups. Representative such groups are isopropyl, isobutyl, and tert-butyl. E/X/Y terpolymers in which X is isobutyl acrylate, even when made at conversions and temperatures below those established as acceptable for n-alkyl acrylates, produce unsatisfactory swelling ratios. It is believed that other branched acrylate terpolymers will behave in the same way. While it may be possible to produce satisfactory terpolymers containing such branched monomers at extremely low conversions and/or temperatures, such conditions would be highly impractical and economically unattractive.

Another factor which influences the swelling ratio is the amount of CO or $SO_2$ in the terpolymer. The preferred amount of CO or $SO_2$ in the terpolymer is 15% by weight or less, especially about 10%. At higher CO or $SO_2$ levels, the thermal stability of the E/X/Y terpolymer tends to deteriorate to an unacceptable degree.

These copolymerizations usually are run in the presence of a chain transfer agent (telogen), which may be any one of a number of known compounds normally used in such reactions, for example, propane, methanol, or acetone. A polar telogen, especially acetone, is preferred because it also acts as a solvent for the terpolymer and thus reduces reactor fouling. A significant amount of telogen, for example, 12-20 weight percent of the reactor contents can be used.

Generally, the copolymerization conditions are in many respects similar to those used for the preparation of low density polyethylenes and would be well understood by a polymer chemist or a chemical engineer, who would be able to modify them as required to suit his or her particular needs.

PVC plasticized with terpolymers whose swelling ratio does not exceed about 2.14 can be calendered into smooth sheets, which can be used in such applications as, e.g., instrument panel skins, pond liners, and roofing membranes.

While it would be generally expected that terpolymers of the type contemplated by the present invention, and frequently other copolymers as well, would tend to have lower swelling ratios when made at lower conversions and at lower reactor temperatures or at lower $\Delta T$'s, the present inventor has surprisingly recognized the effect of branching on the "nerviness" of blends of these terpolymers with PVC.

An additional benefit of at least some of the blends of this invention is that they also have very good low temperature properties, but all have improved thermal stability, especially when compared with blends of PVC with certain E/VA/CO terpolymers, where VA stands for vinyl acetate. PVC blends with E/VA/CO are now well established commercially as popular plasticized PVC compositions for general use. Particularly good low temperature properties are exhibited by blends of PVC with E/nBA/CO terpolymer, where nBA stands for n-butyl acrylate. The lowest member of this class of terpolymers, where the acrylic ester is methyl acrylate, does not impart to PVC blends improved low temperature properties; yet, it still offers improved thermal stability and the ability of the blends to be calendered into smooth sheets. Typical n-alkyl acrylates suitable in this invention include, for example, methyl acrylate, ethyl acrylate, propyl acrylate, butyl acrylate, pentyl acrylate, hexyl acrylate, heptyl acrylate, and octyl acrylate.

Although the amount of terpolymer plasticizers in blends with PVC may vary over broad ranges, the preferred range is about 20-150 parts of terpolymer per 100 parts of PVC.

The properties of the articles made from PVC blends of the present invention will also to some extent depend on the respective monomer ratios of the terpolymer plasticizers. For example, for limp compositions, the respective weight proportions of X and Y monomers in the E/X/Y terpolymer will be about 10-60% and 10-20%, while for rigid or semirigid articles, they will be about 5-25% and 3-7%.

This invention is now illustrated by the following examples of certain preferred embodiments thereof, where all parts, proportions, and percentages are by weight, unless otherwise indicated.

The terpolymers were prepared according to the general process and in the equipment described in U.S. Pat. Nos. 3,780,140 and 3,684,778. Commercial ethylene, carbon monoxide, and pure n-alkyl acrylate were fed in a continuous manner to a stirred pressure vessel. Free-radical initiator was fed by a separate line. The flow of monomers was adjusted to give constant mole ratios, and the feed rate was the same as the rate of discharge of polymer and of unchanged monomers from the reactor. Allowance was made for the different rates of polymerization of the various comonomers, so that none of them was depleted. The polymerization initiator was a commercial peroxide. A small amount of a telogen (chain transfer agent) also was introduced into the reactor with the feed monomers to control the molecular weight. The components and the experimental conditions are shown in the following Table I, where Examples 1-11 are within the scope of the present invention, while C1-C19 are comparative examples, either based on the conventional techniques of polymerization to high conversion or on the use of a branched acrylate or of vinyl acetate.

The following abbreviations are used in Table I:
E = ethylene
nBA = n-butyl acrylate
EA = ethyl acrylate
VAc = vinyl acetate
MA = methyl acrylate
IBA = isobutyl acrylate All acrylic esters as well as vinyl acetate contained polymerization inhibitors and were used as received, without purification.

Commercial polymerization initiators used in the experiments are designated as follows:
A = di(sec-butyl) peroxydicarbonate solution in an 80/20 mixture of t-butyl alcohol/methanol.
B = t-butyl peroctoate solution in an 80/20 mixture of t-butyl alcohol/methanol.

Table II provides the compositions, melt indices, molecular weight distributions, and swelling ratios of the resulting terpolymers, while Table III gives the appearance of calendered sheets made from blends of 100 parts of PVC with 80 parts of terpolymers, as well as (for most terpolymers) torsional modulus values at five temperatures.

In all the Tables, results originally obtained in units other than SI have been converted to the SI units.

The swelling ratios were determined according to a method developed in the laboratories of the assignee of the present invention. A standard melt indexer constructed and operated according to the requirements of ASTM D-1238 is used. The diameter of the melt indexer's orifice is 0.0825 inch (2.096 mm). The temperature is adjusted to 115° C. and maintained within ±2° C. A weight of 10,000 g is used. A 6.5-7 g sample of polymer blend is charged into the indexer in less than 60 seconds. The sample is preheated for 6 minutes without applying external force. The sample extruded during that period is cut off and discarded. Material is allowed to extrude through the orifice until about 2.5-3.8 cm of extrudate has been obtained. This extrudate is cut off and allowed to cool for at least 10 minutes. The average diameter of the forward end (about 9-10 mm) is measured with a micrometer. The swelling ratio is calculated as the ratio of the average diameter to the diameter of the orifice.

Conversions were determined by determining the proportion of polymer in the monomer/polymer/solvent (if any) output stream, while knowing the monomer and solvent feed rates, and making the appropriate material balance calculations.

TABLE I

| | | | TERPOLYMER SYNTHESIS | | | |
|---|---|---|---|---|---|---|
| | | | Initiator | Feed Rates (kg/hr) or Relative Rates(r) | | |
| Example | Polymer | Telogen | Comp. Concn (ppm) | Monomers | Telogen | Init. sol. |

TABLE I-continued

| | | | | | | | | |
|---|---|---|---|---|---|---|---|---|
| 1 | E/nBACO | Methanol | A 1885 | 5.67 | 0.33 | 0.19 | 1.20 | 0.12 |
| 2 | E/nBA/CO | Acetone | B 394 | 5.67 | 0.32 | 0.17 | 0.30 | 0.073 |
| 3 | E/MA/CO | Methanol | A 471 | 5.67 | 0.32 | 0.15 | 0.73 | 0.21 |
| 4 | E/EA/CO | Methanol | A 471 | 5.67 | 0.23 | 0.12 | 0.89 | 0.29 |
| 5 | E/nBA/CO | Acet/Meth (90/10) | B 394 | 5.67 | 0.34 | 0.15 | 0.32 | 0.068 |
| 6 | E/EA/CO | Methanol | A 471 | 5.67 | 0.35 | 0.17 | 0.37 | 0.30 |
| 7 | E/nBA/CO | Propane | A 942 | 5.68 | 0.26 | 0.13 | 0.91 | 0.14 |
| 8 | E/nBA/CO | Acet/Meth (90/10) | A 942 | 5.68 | 0.25 | 0.12 | 0.35 | 0.050 |
| 9 | E/nBA/CO | Acet/Meth (90/10) | A 471 | 5.68 | 0.26 | 0.11 | 0.30 | 0.10 |
| 10 | E/nBA/CO | Acet/Meth (90/10) | A 471 | 5.68 | 0.24 | 0.10 | 0.43 | 0.091 |
| 11 | E/nBA/CO | Acetone | A 942 | 6.26 | 0.29 | 0.11 | 0.40 | 0.091 |
| C1 | E/nBA/CO | Methanol | A 1885 | 5.67 | 0.32 | 0.17 | 1.16 | 0.29 |
| C2 | E/nBA/CO | Acet/Meth | B 197 | 5.67 | 0.41 | 0.22 | 0.42 | 0.17 |
| C3 | E/nBA/CO | Propane | | [12.77 | 0.96 | 0.38(r)] | [0.99(r)] | |
| C4 | E/VAc/CO | Propane | | [11.77 | 4.95 | 0.35(r)] | [0.395(r)] | |
| C5 | E/MA/CO | Methanol | A 942 | 6.35 | 0.53 | 0.29 | 0.52 | 0.54 |
| C6 | E/MA/CO | Methanol | A 1649 | 6.35 | 0.97 | 0.27 | 0.53 | 0.37 |
| C7 | E/EA/CO | Methanol | A 1649 | 6.35 | 1.06 | 0.27 | 0.50 | 0.30 |
| C8 | E/EA/CO | Methanol | A 1649 | 6.35 | 0.91 | 0.27 | 0.51 | 0.33 |
| C9 | E/VAc/CO | — | B 1972 | 6.35 | 3.18 | 0.20 | None | 0.03 |
| C10 | E/VAc/CO | — | B 1972 | 6.35 | 3.22 | 0.19 | None | 0.03 |
| C11 | E/VAc/CO | — | B 1972 | 6.35 | 3.26 | 0.23 | None | 0.16 |
| C12 | E/VAc/CO | — | B 1972 | 6.35 | 3.48 | 0.19 | None | 0.22 |
| C13 | E/IBA/CO | — | B 592 | 4.54 | 0.49 | 0.14 | None | 0.05 |
| C14 | E/IBA/CO | Cyclohexane | B 592 | 4.54 | 0.45 | 0.17 | 0.045 | 0.08 |
| C15 | E/IBA/CO | Cyclohexane | B 592 | 4.54 | 0.40 | 0.22 | 0.17 | 0.11 |
| C16 | E/IBA/CO | Cyclohexane | B 592 | 4.54 | 0.66 | 0.20 | 0.20 | 0.07 |
| C17 | E/IBA/CO | Cyclohexane | B 592 | 4.54 | 0.51 | 0.18 | 0.31 | 0.02 |
| C18 | E/IBA/CO | Cyclohexane | — | 4.54 | 0.50 | 0.15 | 0.19 | 0.02 |
| C19 | E/nBA/CO | Acet/Meth (90/10) | A 942 | 5.68 | 0.19 | 0.19 | 0.30 | 0.09 |

| Example | Press. (MPa) | Agitat. rpm | Monomer Inlet Temp | Reactor Temp (°C.) | ΔT | Conver.(1) |
|---|---|---|---|---|---|---|
| 1 | 172.3 | 2400 | 34 | 161 | 127 | 11.1 |
| 2 | 172.3 | 2400 | 60 | 192 | 132 | 9.1 |
| 3 | 172.3 | 2400 | 59 | 162 | 103 | 6.2 |
| 4 | 172.3 | 2400 | 60 | 160 | 100 | 6.9 |
| 5 | 172.3 | 2400 | 60 | 190 | 130 | 8.0 |
| 6 | 172.3 | 2400 | 32 | 189 | 157 | 11.7 |
| 7 | 186.2 | 2330 | 30 | 160 | 130 | 7.7 |
| 8 | 186.2 | 2420 | 30 | 160 | 130 | 6.5 |
| 9 | 186.2 | 2430 | 50 | 160 | 110 | 5.7 |
| 10 | 186.2 | 2345 | 50 | 160 | 110 | 5.8 |
| 11 | 186.2 | 2320 | 30 | 160 | 130 | 7.4 |
| C1 | 172.3 | 2400 | 13 | 159 | 146 | 13.2 |
| C2 | 172.3 | 2400 | 25 | 190 | 165 | 10.5 |
| C3 | 186.2 | — | 50 | 190 | 140 | — |
| C4 | 165.5 | — | 55 | 190 | 135 | — |
| C5 | 172.3 | 2400 | 20 | 189 | 169 | 17.2 |
| C6 | 172.3 | 2400 | 10 | 191 | 181 | 16.8 |
| C7 | 172.3 | 2400 | 17 | 190 | 173 | 16.4 |
| C8 | 172.3 | 2400 | 10 | 190 | 180 | 17.3 |
| C9 | 172.3 | 1880 | 50 | 191 | 141 | 8.7 |
| C10 | 172.3 | 1840 | 31 | 190 | 159 | 10.1 |
| C11 | 172.3 | 1885 | 10 | 189 | 179 | 11.8 |
| C12 | 172.3 | 1888 | 2 | 190 | 188 | 12.5 |
| C13 | 172.3 | 2335 | 32 | 186 | 154 | 13.0 |
| C14 | 172.3 | 2370 | 31 | 186 | 155 | 12.8 |
| C15 | 172.3 | 2340 | 29 | 187 | 158 | 11.0 |
| C16 | 186.2 | 2340 | 60 | 185 | 125 | 9.3 |
| C17 | 186.2 | 2340 | 60 | 185 | 125 | 6.9 |
| C18 | 186.2 | 2340 | 63 | 188 | 125 | 6.3 |
| C19 | 186.2 | 2200 | 30 | 160 | 130 | 5.8 |

(1)Approximate ±1.0%

TABLE II

POLYMER PROPERTIES

| Example | E/X/Y Composition | MI | Swelling Ratio | $M_w/M_n$ |
|---|---|---|---|---|
| 1 | 54.8/32.3/13 | 19.1 | 1.98 | 4.22 |
| 2 | 60.4/30.1/9.5 | 21.1 | 2.05 | 4.57 |
| 3 | 54.8/31.5/10.1 | 6.3 | 1.88 | 3.66 |
| 4 | 42.2/39.6/18.2 | 19.7 | 1.88 | 6.05 |
| 5 | 55.8/33.2/11 | 13.6 | 2.13 | |
| 6 | 47.8/37.5/14.7 | 21.2 | 2.12 | 5.24 |
| 7 | 57.3/32.2/10.5 | 4.6 | 2.01 | |
| 8 | 55.1/33.1/11.8 | 6.3 | 1.91 | |
| 9 | 53.5/35.0/11.5 | 5.3 | 1.86 | |
| 10 | 56.9/32.1/11.0 | 17.8 | 1.84 | |

TABLE II-continued
POLYMER PROPERTIES

| Example | E/X/Y Composition | MI | Swelling Ratio | $M_w/M_n$ |
|---|---|---|---|---|
| 11 | 58.6/32.8/8.6 | 8.3 | 1.89 | |
| C1 | 53.8/29.6/16.6 | 19.8 | 2.18 | 3.71 |
| C2 | 48/39.8/12.2 | 26.1 | 2.38 | 5.56 |
| C3 | 60/30.6/9.6 | 8.3 | 2.38 | 8.20 |
| C4 | 62.5/28.5/9.0 | 37.2 | 1.97 | |
| C5 | 59.5/29.1/11.4 | 24.2 | 2.37 | 7.52 |
| C6 | 61.2/27.2/11.6 | 19.3 | 2.29 | |
| C7 | 56.3/32.1/11.6 | 27.4 | 2.34 | 7.10 |
| C8 | 58.2/30.1/11.7 | 40.4 | 2.24 | |
| C9 | 60.2/28.9/10.9 | 17.5 | 1.92 | 4.91 |
| C10 | 60.8/29.6/9.6 | 23.3 | 1.94 | |
| C11 | 58.5/30.9/10.6 | 20.5 | 2.01 | |
| C12 | 60.5/29.6/9.9 | 22.6 | 2.07 | 6.63 |
| C13 | 56.3/34.9/8.8 | 3.5 | 2.38 | |
| C14 | 55.7/34.5/9.8 | 3.5 | 2.34 | |
| C15 | 49.8/37.6/12.7 | 0.4 | 2.43 | |
| C16 | 48.8/39.3/11.9 | 3.2 | 2.42 | |
| C17 | 49.7/38.2/12.1 | 3.3 | 2.41 | 5.56 |
| C18 | 54.2/35.8/10.0 | 9.5 | 2.20 | 5.41 |
| C19 | 52.1/32.3/15.6 | 15.7 | 2.18 | |

TABLE III
BLEND PROPERTIES

| Example | Appearance Milled Sheet | Torsion Modulus, (MPa) | | | | |
|---|---|---|---|---|---|---|
| | | 25° C. | 10° C. | 0° C. | −10° C. | −20° C. |
| 1 | Smooth | 2.63 | 6.50 | 34.7 | 162.5 | 327.5 |
| 2 | Smooth | 5.92 | 19.94 | 63.9 | 188.7 | 354.6 |
| 3 | Smooth | 3.93 | 16.71 | 124.3 | 354.6 | 491.4 |
| 4 | Smooth | 3.91 | 12.63 | 100.6 | 269.5 | 449.3 |
| 5 | Sl. Rough | 3.14 | 6.97 | 30.7 | 132.9 | 323.4 |
| 6 | Sl. Rough | 3.91 | 10.90 | 56.3 | 232.8 | 430.2 |
| 7 | Smooth | — | — | — | — | — |
| 8 | Smooth | — | — | — | — | — |
| 9 | Smooth | — | — | — | — | — |
| 10 | V. Smooth | — | — | — | — | — |
| 11 | Smooth | — | — | — | — | — |
| C1 | Sl. Rough | 5.01 | 18.76 | 75.2 | 239.1 | 371.3 |
| C2 | Rough | 2.82 | 8.28 | 42.1 | 171.4 | 330.5 |
| C3 | Rough | 3.18 | 8.62 | 40.0 | 170.4 | 345.5 |
| C4 | Smooth | 7.26 | 26.66 | 115.2 | 291.5 | — |
| C5 | Rough | 3.87 | 14.76 | 104.9 | 330.0 | 493.8 |
| C6 | Rough | 4.67 | 17.72 | 99.7 | 343.8 | 517.7 |
| C7 | Rough | 4.68 | 8.28 | 49.4 | 200.2 | 414.9 |
| C8 | Rough | 4.60 | 11.52 | 61.8 | 227.4 | 421.6 |
| C9 | Smooth | 3.63 | 14.9 | 101.4 | 300.9 | 467.8 |
| C10 | Smooth | 4.66 | 17.1 | 112.7 | 315.5 | 478.15 |
| C11 | V. Sl. Rough | 3.66 | 18.76 | 118.5 | 333.7 | 510.3 |
| C12 | V. Sl. Rough | 5.15 | 17.10 | 106.6 | 333.5 | 503.3 |
| C13 | Rough | — | — | — | — | — |
| C14 | Rough | — | — | — | — | — |
| C15 | Rough | — | — | — | — | — |
| C16 | Rough | — | — | — | — | — |
| C17 | Rough | — | — | — | — | — |
| C18 | Rough | — | — | — | — | — |
| C19 | Rough | — | — | — | — | — |

We claim:

1. A composition consisting essentially of a blend of polyvinyl chloride with a terpolymer having the general formula E/X/Y, wherein E is ethylene; Y is CO or $SO_2$; and X is a $C_2$-$C_{10}$ n-alkyl acrylate, said terpolymer having a maximum die swell ratio of about 2.14; the respective weight proportions of X and Y in the terpolymer being 5-60% and 3-20%, and ethylene constituting the balance, (100% -X% -Y%) of 20-92%, of the terpolymer weight; said blend comprising about 20-400 parts by weight of the E/X/Y terpolymer per 100 parts by weight of polyvinyl chloride.

2. A composition of claim 1 wherein the amount of Y in the terpolymer is at most 15 weight percent.

3. A composition of claim 2 wherein the amount of Y in the terpolymer is at most 10 weight percent.

4. A composition of claim 2 wherein Y is CO.

5. A composition of claim 4 wherein X is methyl acrylate.

6. A composition of claim 4 wherein X is n-butyl acrylate.

7. A composition of claim 4 wherein X is ethyl acrylate.

8. A calendered sheet made from a composition consisting essentially of a blend of polyvinyl chloride with a terpolymer having the general formula E/X/Y, wherein E is ethylene; Y is CO or $SO_2$; and X is a $C_2$-$C_{10}$ n-alkyl acrylate, said terpolymer having a maximum die swell ratio of about 2.14; the respective weight proportions of X and Y in the terpolymer being 5-60% and 3-20%, and ethylene constituting the balance, (100% -X% -Y%) of 20-92%, of the terpolymer weight; said blend comprising about 20-400 parts by weight of the E/X/Y terpolymer per 100 parts by weight of polyvinyl chloride.

9. A calendered sheet of claim 8 wherein the amount of Y in the terpolymer is at most 15 weight percent.

10. A calendered sheet of claim 9 wherein the amount of Y in the terpolymer is at most 10 weight percent.

11. A calendered sheet of claim 9 wherein Y is CO.

12. A calendered sheet of claim 11 wherein the comonomer X in the E/X/Y terpolymer is ethyl acrylate.

13. A calendered sheet of claim 11 wherein the comonomer X in the E/X/Y terpolymer is n-butyl acrylate.

* * * * *